(12) United States Patent
Kishiyama et al.

(10) Patent No.: US 8,477,696 B2
(45) Date of Patent: Jul. 2, 2013

(54) TRANSMISSION APPARATUS AND TRANSMISSION METHOD FOR A DOWNLINK CHANNEL

(75) Inventors: Yoshihisa Kishiyama, Yokosuka (JP); Kenichi Higuchi, Yokohama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 404 days.

(21) Appl. No.: 12/161,172

(22) PCT Filed: Jan. 10, 2007

(86) PCT No.: PCT/JP2007/050142
§ 371 (c)(1),
(2), (4) Date: Oct. 21, 2008

(87) PCT Pub. No.: WO2007/083543
PCT Pub. Date: Jul. 26, 2007

(65) Prior Publication Data
US 2010/0111204 A1 May 6, 2010

(30) Foreign Application Priority Data
Jan. 17, 2006 (JP) ................................. 2006-009298

(51) Int. Cl.
*H04W 4/00* (2009.01)
(52) U.S. Cl.
USPC ........... 370/329; 370/341; 370/343; 370/433; 455/17; 455/45
(58) Field of Classification Search
USPC .................. 370/329–350, 431–463; 455/507, 455/509–517
See application file for complete search history.

(56) References Cited

U.S. PATENT DOCUMENTS

| | | | |
|---|---|---|---|
| 2006/0164972 A1* | 7/2006 | van Rensburg et al. | 370/208 |
| 2006/0215603 A1* | 9/2006 | Nishio et al. | 370/329 |
| 2007/0165568 A1* | 7/2007 | Damnjanovic et al. | 370/329 |
| 2008/0198902 A1* | 8/2008 | Malladi | 375/134 |
| 2010/0105390 A1* | 4/2010 | Ishii | 455/436 |

FOREIGN PATENT DOCUMENTS

| | | |
|---|---|---|
| EP | 1 887 723 A1 | 2/2008 |
| JP | 2002-111631 A | 4/2002 |
| JP | 2004-208234 A | 7/2004 |
| JP | 2004-312291 A | 11/2004 |
| JP | 2005-117581 A | 4/2005 |
| WO | 2005/020613 A2 | 3/2005 |
| WO | 2005/112378 A1 | 11/2005 |
| WO | 2005/114940 A1 | 12/2005 |
| WO | 2006/137495 A1 | 12/2006 |

OTHER PUBLICATIONS

International Search Report w/translation from PCT/JP2007/050142 dated Mar. 13, 2007 (4 pages).

(Continued)

*Primary Examiner* — Ayaz R. Sheikh
*Assistant Examiner* — Mounir Moutaouakil
(74) *Attorney, Agent, or Firm* — Osha • Liang LLP (57) ABSTRACT

The object is achieved by providing a transmission apparatus with: assignment means configured to assign, to each user, one of a frequency block that is obtained by dividing a system bandwidth into each block of continuous frequency subcarriers and a distributed type frequency block that include a frequency subcarrier that is discretely distributed in the system bandwidth; and mapping means configured to assign transmission data to one of the frequency block and the distributed type frequency block according to the assignment.

6 Claims, 9 Drawing Sheets

OTHER PUBLICATIONS

Written Opinion from PCT/JP2007/050142 dated Mar. 13, 2007 (4 pages).

"Downlink Channelization and Multiplexing for EUTRA"; 3GPP TSG RAN WG1 Ad Hoc on LTE, SophiaAntipolis, France; R1-050604; Jun. 20-21, 2005, pp. 1-9 (9 pages).

Office Action mailed Apr. 21, 2009 Issued with respect to the Japanese Patent Application No. 2006-009298; 4 pgs.

Patent Abstracts of Japan, Publication No. 2004-208234, publication Date Jul. 22, 2004, 1 page.

Japanese Office Action for Application No. 2009-145157, mailed on Feb. 14, 2012 (2 pages).

Patent Abstracts of Japan for Japanese Publication No. 2004-312291, publication date Nov. 4, 2004 (1 page).

Office Action for Japanese Patent Application No. 2009-145157 mailed Oct. 16, 2012, with English translation thereof (4 pages).

Patent Abstract for Japanese Publication No. 2002-111631 published Apr. 12, 2002 (1 page).

\* cited by examiner

TRANSMISSION APPARATUS AND TRANSMISSION METHOD FOR A DOWNLINK CHANNEL

TECHNICAL FIELD

The present invention relates to a transmission apparatus and a transmission method.

BACKGROUND ART

There are Localized type transmission and Distributed type transmission as a transmission method in a downlink data channel.

Figure 1A:
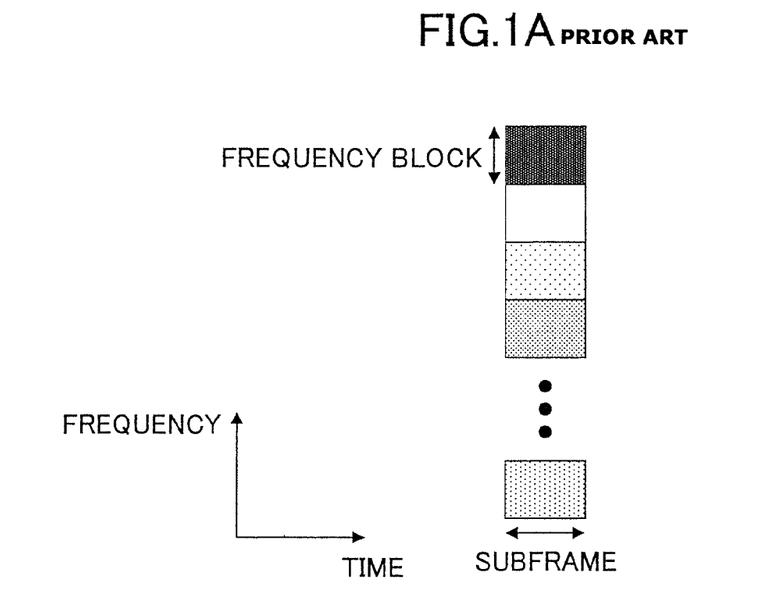
FIG. 1A is a schematic diagram indicating Localized type transmission.

As shown in FIG. 1A, in the Localized type transmission, each user is assigned a frequency block as a unit. For example, in the Localized type transmission, a frequency block in which frequency selectivity fading is good is assigned. Generally, the Localized type transmission is a transmission method that is effective when a transmission data size is large and frequency scheduling effect is aimed.

Figure 1B:
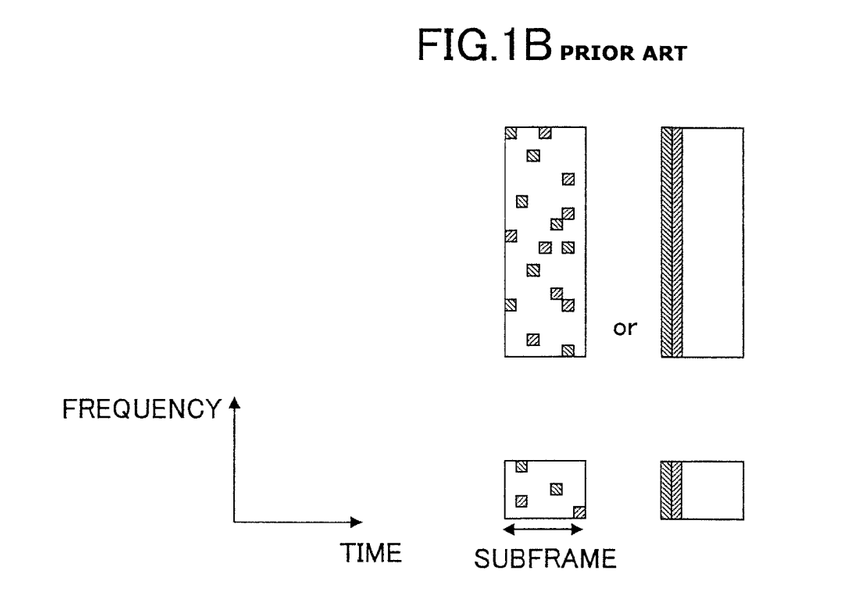
FIG. 1B is a schematic diagram indicating Distributed type transmission.

As shown in FIG. 1B, in the Distributed type transmission, data is transmitted by distributing the data over the whole of an assigned band irrespective of frequency blocks. For example, the Distributed type transmission is used in a state in which frequency scheduling cannot be performed due to high-speed movement, and is used when transmission data is small such as VoIP. Generally, the Distributed type transmission is a transmission method effective when transmission data size is small and frequency diversity effect is aimed.

DISCLOSURE OF THE INVENTION

Problem to be Solved by the Invention

However, the above-mentioned background art has following problems.

It is necessary that one system supports communications for cases from low speed movement to high speed movement.

In addition, it is necessary that one system supports various packets from packets of large data size such as Web browsing to packets of small data size such as VoIP.

Thus, the present invention is contrived for solving the above-mentioned problem, and the object is to provide a transmission apparatus and a transmission method that can support the Localized type transmission and the Distributed type transmission using one system.

Means for Solving the Problem

For solving the problem, a transmission apparatus of the present invention includes, as a feature, assignment means configured to assign, to each user, one of a frequency block that is obtained by dividing a system bandwidth into each block of continuous frequency subcarriers and a distributed type frequency block that include a frequency subcarrier that is discretely distributed in the system bandwidth; and mapping means configured to assign transmission data to one of the frequency block and the distributed type frequency block according to the assignment.

By configuring like this, Localized type transmission and Distributed type transmission can be supported by one system.

A transmission method of the present invention includes, as a feature, an assignment step of assigning, to each user, one of a frequency block that is obtained by dividing a system bandwidth into each block of continuous frequency subcarriers and a distributed type frequency block that includes a frequency subcarrier that is discretely distributed in the system bandwidth; and a mapping step of assigning transmission data to one of the frequency block and the distributed type frequency block according to the assignment.

By configuring like this, Localized type transmission and Distributed type transmission can be supported by one system.

Effect of the Invention

According to embodiments of the present invention, a transmission apparatus and a transmission method that can support the Localized type transmission and the Distributed type transmission using one system can be realized.

DESCRIPTION OF REFERENCE SIGNS

100 transmission apparatus

PREFERRED EMBODIMENTS FOR CARRYING OUT THE INVENTION

Next, preferred embodiments for carrying out the present invention are described with reference to figures based on the following embodiments.

By the way, in all of the figures for explaining the embodiments, parts having the same function are represented by a same symbol and repeating descriptions are not provided.

Figure 2:
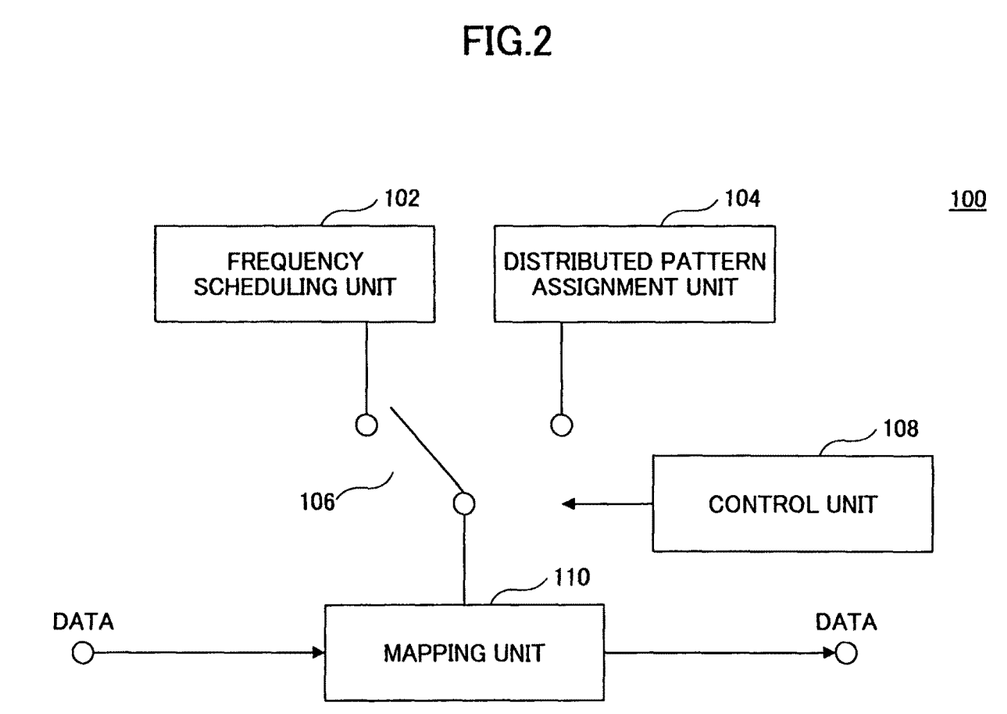
FIG. 2 is a partial block diagram showing a transmission apparatus according to an embodiment of the present invention.

A transmission apparatus of a first embodiment of the present invention is described with reference to FIG. 2.

The transmission apparatus 100 of the present embodiment switches between Localized type transmission and Distributed type transmission in a time division manner. For example, the transmission apparatus 100 switches between Localized type transmission and Distributed type transmission every subframe.

The transmission apparatus 100 includes a frequency scheduling unit 102, a distributed pattern assignment unit 104, a mapping unit 110, a switch 106 that is connected to the mapping unit 110 and that switches between the frequency scheduling unit 102 and the distributed pattern assignment unit 104, and a control unit 108 for controlling the switch 106.

The frequency scheduling unit 102 performs assignment of a frequency block for each user in a time when performing Localized type transmission. For example, the frequency scheduling unit 102 assigns a frequency block to each user based on frequency selective fading, for example. The frequency block is a unit obtained by dividing a system bandwidth into blocks each having continuous frequency subcarriers.

The distributed pattern assignment unit 104 performs assignment of subcarriers for each user in a time when performing Distributed type transmission. For example, the distributed pattern assignment unit 104 assigns distributed type frequency blocks to each user as a unit by distributing them over the whole assigned band, the distributed type frequency blocks including frequency subcarriers that are discretely distributed in a system bandwidth. For example, the distributed type frequency block is formed by one or more subcarriers and a divided subframe obtained by dividing a subframe.

For example, using the distributed type frequency blocks as an assignment unit, positions at which distributed type frequency blocks are placed in a time when performing Distributed type transmission are predetermined as a Distributed pattern. The distributed pattern assignment unit 104 places the distributed type frequency blocks based on the Distributed pattern.

In addition, by preparing a plurality of Distributed patterns, the distributed pattern assignment unit 104 may select one from the plurality of Distributed patterns based on a predetermined condition to place distributed type frequency blocks based on the selected Distributed pattern.

The switch 106 switches between Localized type transmission and Distributed type transmission.

The control unit 108 performs control for the switch 106. For example, the control unit 108 controls the switch in units of predetermined periods that is subframes, for example. As a result, Localized type transmission and Distributed type transmission are switched in units of subframes. For example, the control unit 108 controls the switch 106 such that Localized type transmission and Distributed type transmission are switched in a fixed proportion, that is, in the proportion of three to one, for example.

In addition, the control unit 108 may control the switch 106 so as to switch between the Localized type transmission and the Distributed type transmission in a proportion of traffic.

The mapping unit 110 assigns data to a frequency block in a time domain, that is, in a subframe, for example, for performing Localized type transmission. In addition, the mapping unit 110 assigns data based on an input Distributed pattern in a time domain, that is, in a subframe, for example, for performing Distributed type transmission.

Figure 3:
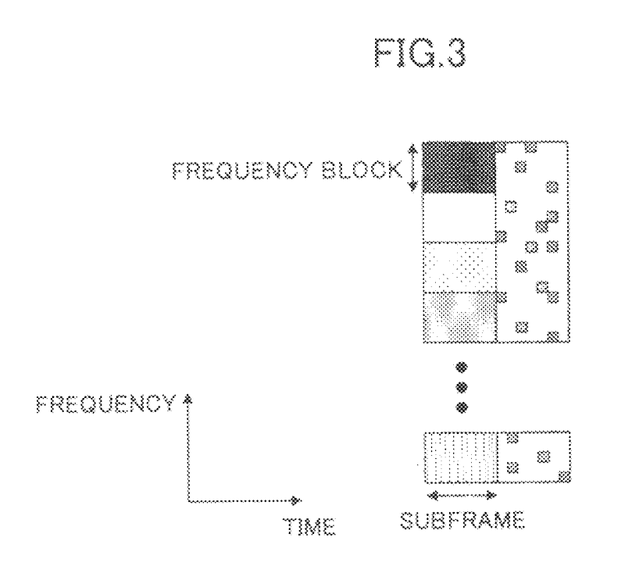
FIG. 3 is a schematic diagram showing operation of the transmission apparatus according to an embodiment of the present invention.

As a result, as shown in FIG. 3, Localized type transmission and Distributed type transmission are performed in units of time, that is, in units of subframes, for example.

Accordingly, frequency diversity effect can be obtained at a maximum for both of the Localized type transmission and the Distributed type transmission.

Figure 4:
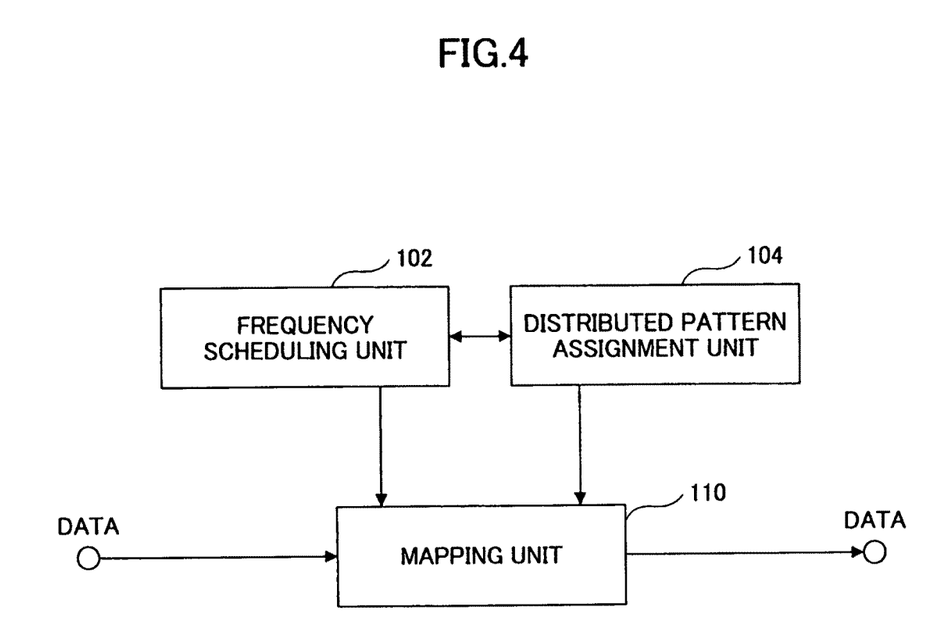
FIG. 4 is a partial block diagram showing a transmission apparatus according to an embodiment of the present invention.

Next, a transmission apparatus of the second embodiment of the present invention is described with reference to FIG. 4.

The transmission apparatus 100 of the present embodiment switches between the Localized type transmission and the Distributed type transmission in units of frequency blocks. For example, the transmission apparatus 100 assigns users that perform Localized type transmission and Distributed type transmission in units of frequency blocks and distributed type frequency blocks.

The transmission apparatus 100 includes a frequency scheduling unit 102, a distributed pattern assignment unit 104 and a mapping unit 110 connected to the frequency scheduling unit 102. The distributed pattern assignment unit 104 is connected to the mapping unit 110.

The frequency scheduling unit 102 performs assignment of frequency blocks for each user. For example, the frequency scheduling unit 102 assigns a frequency block to each user based on frequency selective fading. In addition, the frequency scheduling unit 102 supplies information indicating an assigned frequency block to the distributed pattern assignment unit 104 and the mapping unit 110.

The distributed pattern assignment unit 104 places distributed type frequency blocks by distributing them over the whole of frequency blocks other than the frequency blocks assigned to users in the frequency scheduling unit 102 based on information indicating frequency blocks supplied from the frequency scheduling unit 102.

For example, using distributed type frequency blocks as an assignment unit, positions for placing the distributed type frequency blocks on frequency blocks are predetermined as a Distributed pattern. The distributed pattern assignment unit 104 places distributed frequency blocks on frequency blocks other than the assigned frequency blocks in the frequency scheduling unit 102 so as to assign each user to the distributed type frequency blocks.

In addition, a plurality of Distributed patterns may be prepared so that the distributed pattern assignment unit 104 may select one pattern from the plurality of Distributed patterns based on a predetermined condition, place distributed type frequency blocks based on the selected Distributed pattern to assign each user.

The mapping unit 110 assigns data to a frequency block to which a user for performing Localized type transmission is assigned. In addition, the mapping unit 110 assigns data to distributed type frequency blocks placed on frequency blocks other than the frequency blocks to which users performing Localized type transmission are assigned.

Figure 5:
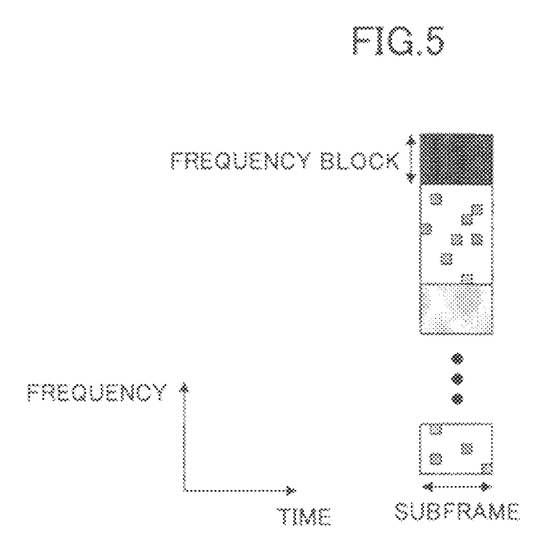
FIG. 5 is a schematic diagram showing operation of the transmission apparatus according to an embodiment of the present invention.

As a result, as shown in FIG. 5, data for Localized type transmission and data for Distributed type transmission are divided in units of frequency blocks and transmitted.

Accordingly, bad influences to scheduling effects in the Localized type transmission can be decreased compared with the case in which Localized type transmission and Distributed type transmission are switched in a time division manner.

In addition, since the whole subframe is used, flexibility in the time direction can be improved. For example, in the case when the Localized type transmission and the Distributed type transmission are switched in the time division manner, retransmission for the Localized type transmission can be performed only during a time when Localized type transmission is performed, and retransmission for Distributed type transmission can be performed only during a time when Distributed type transmission is performed. According to the transmission apparatus 100 of the present embodiment, such temporal restriction in the retransmission control can be decreased.

Figure 6:
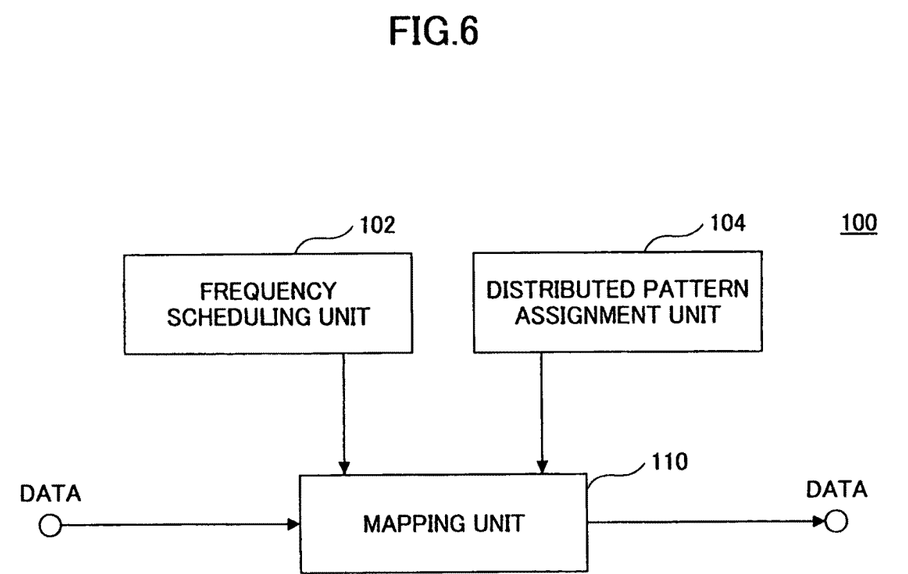
FIG. 6 is a partial block diagram showing a transmission apparatus according to an embodiment of the present invention.

Next, a transmission apparatus of the third embodiment of the present invention is described with reference to FIG. 6.

The transmission apparatus 100 of the present embodiment performs Localized type transmission and Distributed type transmission such that Localized type transmission and Distributed type transmission coexist in a same time, that is, in a same subframe, for example.

The transmission apparatus 100 includes a frequency scheduling unit 102, a distributed pattern assignment unit 104, and a mapping unit 110 connected the frequency scheduling unit 102 and the distributed pattern assignment unit 104.

The frequency scheduling unit 102 performs frequency block assignment to each user. For example, the frequency scheduling unit 102 assigns a frequency block to each user based on frequency selective fading, for example.

The distributed pattern assignment unit 104 performs assignment of distributed type frequency blocks to each user. For example, the distributed pattern assignment unit 104 assigns distributed type frequency blocks as a unit to each user by distributing them over the whole assigned band.

For example, the distributed pattern assignment unit 104 makes holes in a frequency block by which Localized type transmission is performed. That is, the distributed pattern assignment unit 104 reserves resources for performing Distributed type transmission beforehand or performs puncturing so as to embed data for performing Distributed type transmission.

In this case, using distributed type frequency blocks as assignment units, positions at which distributed type frequency blocks are placed are predetermined as a Distributed pattern. The distributed pattern assignment unit 104 places the distributed type frequency blocks based on the Distributed pattern to assign each user.

In addition, by preparing a plurality of Distributed patterns, the distributed pattern assignment unit 104 may select one from the plurality of Distributed patterns based on a predetermined condition to place distributed type frequency blocks based on the selected Distributed pattern for assigning them to each user.

The mapping unit 110 assigns data to a frequency block and a distributed type frequency block. In this case, data for Localized type transmission is assigned based on information indicating the frequency block. In addition, the mapping unit 110 assigns data based on the supplied Distributed pattern. Therefore, even in a frequency block in which data for Localized type transmission is assigned, data for Localized type transmission is not assigned in a part of distributed type frequency blocks to which data for Distributed type transmission is assigned.

Figure 7:
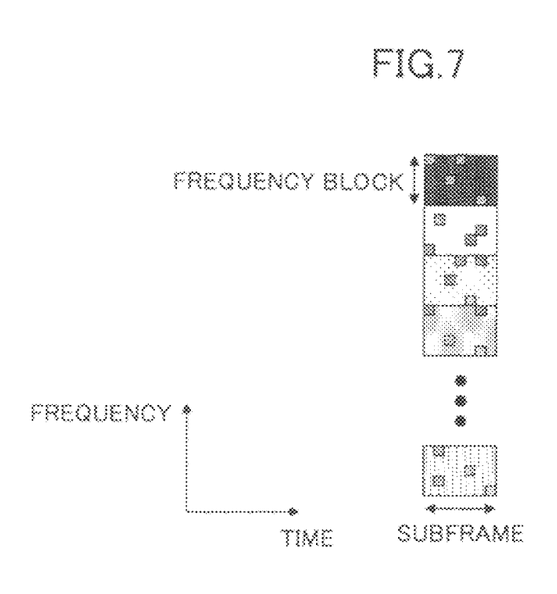
FIG. 7 is a schematic diagram showing operation of the transmission apparatus according to an embodiment of the present invention.

As a result, as shown in FIG. 7, data for Localized type transmission and data for Distributed type transmission are transmitted such that they are coexist in a same time.

Accordingly, frequency diversity effect can be obtained for both of data for Localized type transmission and data for Distributed type transmission.

Figure 8:
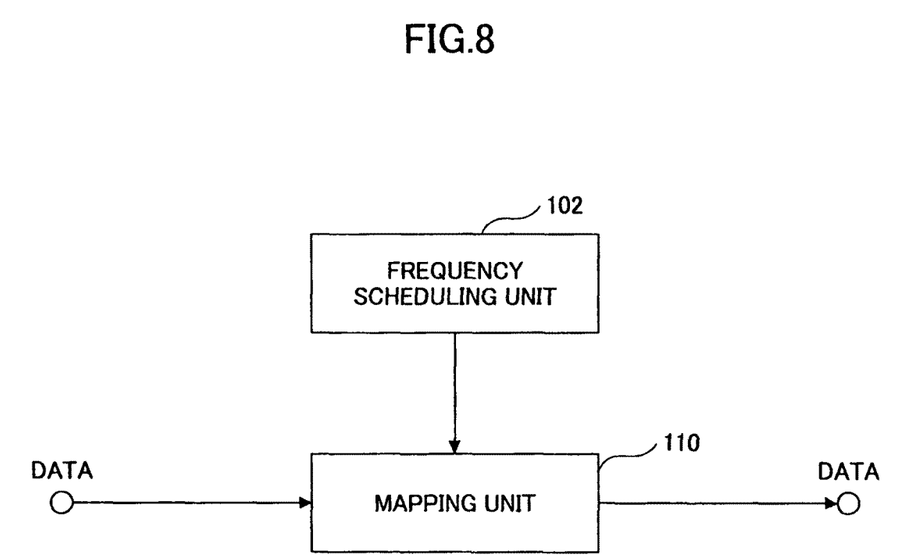
FIG. 8 is a partial block diagram showing a transmission apparatus according to an embodiment of the present invention.

Next, a transmission apparatus according to a fourth embodiment of the present invention is described with reference to FIG. 8.

The transmission apparatus 100 of the present embodiment performs Distributed type transmission in the category of Localized type transmission.

The transmission apparatus 100 includes a frequency scheduling unit 102 and a mapping unit 110 that is connected to the frequency scheduling unit 102, receives transmission data, and that outputs transmission data.

The frequency scheduling unit 102 performs assignment of frequency blocks to users performing Localized type transmission. For example, the frequency scheduling unit 102 assigns a frequency block to a user performing the Localized type transmission based on frequency selective fading, and supplies information indicating the assigned frequency block to the mapping unit 110.

In addition, the frequency scheduling unit 102 performs assignment of frequency blocks also to users that perform Distributed type transmission. For example, the frequency scheduling unit 102 assigns a frequency block to a user that performs Distributed type transmission, and supplies information indicating an assigned frequency block to the mapping unit 110. The frequency scheduling unit 102 selects a frequency block to be assigned to each user using distributed type frequency blocks as a unit, for example.

In addition, considering the distribution type frequency blocks as an assignment unit, positions where distributed type frequency blocks are placed in a frequency block are predetermined as a Distributed pattern. The distributed pattern assignment unit 104 assigns the distributed type frequency blocks to each user based on the Distributed pattern.

In addition, by preparing a plurality of Distributed patterns, the frequency scheduling unit 102 may select one from the plurality of Distributed patterns based on a predetermined condition, and assign distributed type frequency blocks to each user based on the selected Distributed pattern.

The mapping unit 110 assigns data to a frequency block by which Localized type transmission is performed. In addition, the mapping unit 110 assigns data to distributed type frequency blocks that are placed on a frequency block by which Distributed type transmission is performed.

Figure 9:
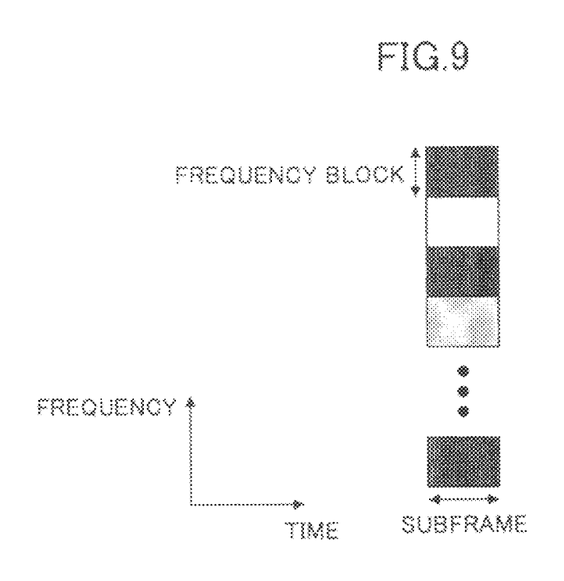
FIG. 9 is a schematic diagram showing operation of the transmission apparatus according to an embodiment of the present invention.

As a result, as shown in FIG. 9, data for Localized type transmission and data for Distributed type transmission are transmitted using frequency blocks as assignment units.

Accordingly, signaling information that is necessary for performing Distributed type transmission can be made unnecessary.

The present international application claims priority based on Japanese patent application No. 2006-009298, filed in the JPO on Jan. 17, 2006 and the entire contents of the Japanese patent application No. 2006-009298 is incorporated herein by reference.

INDUSTRIAL APPLICABILITY

The transmission apparatus and the transmission method of the present invention can be applied to a radio communication system.

The invention claimed is:

1. A transmission apparatus comprising:
a frequency scheduling unit configured to select a frequency block to be assigned to a downlink channel, wherein a system bandwidth is divided into a plurality of frequency blocks each comprising a plurality of consecutive frequency subcarriers in a frequency domain and each comprising a predetermined time length in a time domain, and wherein each frequency block comprises a same size in both of the frequency domain and the time domain; and
a mapping unit configured to map data in the downlink channel to the frequency block selected by the frequency scheduling unit;
wherein the frequency scheduling unit is adapted for a system where distributed type transmission for selecting frequency blocks according to a predetermined pattern for placement of the frequency blocks in the system bandwidth in a manner in which the frequency blocks are distributed depending on points of time and localized type transmission for selecting localized frequency blocks are defined, the frequency scheduling unit using either one of the distributed type transmission and the localized type transmission, wherein each of the frequency blocks having the same size is a common unit in the localized type transmission and the distributed type transmission and wherein each of the frequency blocks used in the distributed type transmission as the common unit is of the same size as each of the frequency blocks used in the localized type transmission as the common unit in both of the frequency domain and the time domain.

2. The transmission apparatus according to claim 1, wherein the frequency scheduling unit switches between frequency block selection of the localized type transmission and frequency block selection of the distributed type transmission based on a predetermined time period.

3. The transmission apparatus according to claim 1, wherein the frequency scheduling unit selects, for the distributed type transmission, a frequency block that is different from a frequency block to be selected for the localized type transmission.

4. A transmission method comprising the steps of:

selecting a frequency block to be assigned to a downlink channel, wherein a system bandwidth is divided into a plurality of frequency blocks each comprising a plurality of consecutive frequency subcarriers in a frequency domain and each comprising a predetermined time length in a time domain, and wherein each frequency block comprises a same size in both of the frequency domain and the time domain; and mapping data in the downlink channel to the selected frequency block;

wherein, in the step of selecting, either one of distributed type transmission and localized type transmission is used, wherein distributed type transmission for selecting frequency blocks according to a predetermined pattern for placement of the frequency blocks in the system bandwidth in a manner in which the frequency blocks are distributed depending on points of time and localized type transmission for selecting localized frequency blocks are defined, and wherein each of the frequency blocks having the same size is a common unit in the localized type transmission and the distributed type transmission and wherein each of the frequency blocks used in the distributed type transmission as the common unit is of the same size as each of the frequency blocks used in the localized type transmission as the common unit in both of the frequency domain and the time domain.

5. The transmission method according to claim 4, wherein the step of selecting includes switching between frequency block selection of the localized type transmission and frequency block selection of the distributed type transmission based on a predetermined time period.

6. The transmission method according to claim 4, wherein the step of selecting includes selecting, for the distributed type transmission, a frequency block that is different from a frequency block to be selected for the localized type transmission.

* * * * *